United States Patent
Norman et al.

(10) Patent No.: US 8,520,143 B2
(45) Date of Patent: Aug. 27, 2013

(54) METHOD AND APPARATUS FOR MEASURING DELAY WITHIN A COMPRESSED DIGITAL STREAM

(75) Inventors: Martin Norman, Cambridge (GB); Paul Robinson, Cambridgeshire (GB)

(73) Assignee: Tektronix International Sales GmbH (CH)

(*) Notice: Subject to any disclaimer, the term of this patent is extended or adjusted under 35 U.S.C. 154(b) by 362 days.

(21) Appl. No.: 12/913,322

(22) Filed: Oct. 27, 2010

(65) Prior Publication Data

US 2011/0169966 A1    Jul. 14, 2011

(30) Foreign Application Priority Data

Nov. 3, 2009 (EP) .................................... 09174903

(51) Int. Cl.
*H04N 9/475* (2006.01)
(52) U.S. Cl.
USPC ........... 348/500; 348/515; 348/516; 348/537; 348/538
(58) Field of Classification Search
USPC ............ 348/464, 507, 512–516, 536–538
See application file for complete search history.

(56) References Cited

U.S. PATENT DOCUMENTS

| | | | | |
|---|---|---|---|---|
| 5,808,722 A * | 9/1998 | Suzuki | ............................. | 352/12 |
| 6,988,238 B1 * | 1/2006 | Kovacevic et al. | ............ | 714/799 |
| 7,023,925 B1 * | 4/2006 | Ward | ........................ | 375/240.26 |
| 7,130,316 B2 * | 10/2006 | Kovacevic | ...................... | 370/509 |
| 7,379,659 B2 * | 5/2008 | Himeno et al. | ................ | 386/239 |
| 7,656,947 B2 * | 2/2010 | Seo et al. | ......................... | 375/240 |
| 7,735,111 B2 * | 6/2010 | Michener et al. | .............. | 725/146 |
| 8,014,484 B2 * | 9/2011 | Fuchikami et al. | ............ | 375/371 |
| 8,331,459 B2 * | 12/2012 | Alekseenko | ............. | 375/240.28 |
| 2003/0128294 A1 * | 7/2003 | Lundblad et al. | .............. | 348/515 |
| 2003/0165323 A1 * | 9/2003 | Demas et al. | ..................... | 386/68 |
| 2004/0109519 A1 * | 6/2004 | Mizukami et al. | ............. | 375/362 |
| 2006/0103760 A1 * | 5/2006 | Johnson et al. | ................ | 348/515 |
| 2006/0146850 A1 * | 7/2006 | Virdi et al. | ..................... | 370/412 |
| 2006/0248559 A1 * | 11/2006 | Michener et al. | ................ | 725/67 |
| 2008/0019675 A1 * | 1/2008 | Hamasaka et al. | ............. | 386/124 |
| 2010/0002729 A1 * | 1/2010 | Won | ............................... | 370/503 |

* cited by examiner

Primary Examiner — Jefferey Harold
Assistant Examiner — Humam Satti
(74) Attorney, Agent, or Firm — Michael A. Nelson; Marger Johnson & McCollom, P.C.; Holly L. Johnston

(57) ABSTRACT

There is provided a method of measuring delay variation between first and second elementary streams in a digital audiovisual data stream, comprising detecting and storing digital audiovisual data stream timestamp values, detecting and storing elementary stream timestamp values for the first and second elementary streams, interpolating the digital audiovisual data stream timestamp values and elementary stream timestamp values to form data sets having mutual sampling points, and subtracting the interpolated data set for the first elementary data stream from the interpolated data set for the second elementary data stream to form elementary stream difference values indicative of changes in delay over time between first and second elementary streams.

13 Claims, 8 Drawing Sheets

METHOD AND APPARATUS FOR MEASURING DELAY WITHIN A COMPRESSED DIGITAL STREAM

TECHNICAL FIELD

The invention is related to digital audiovisual data stream testing in general, and in particular to an improved method and apparatus for measuring delay in a compressed digital audiovisual data stream.

BACKGROUND

Most modern digital television broadcast systems, including so called "On-Demand" television services, Internet Protocol Television (IPTV) and the like, use digital compression and transmission techniques to deliver the audiovisual content to the end viewer.

In these digital audiovisual systems, the audio and video data are compressed by encoders (using commonly used compression standards, such as MPEG-2, MPEG-4, H.264 and the like) to produce individual compressed Elementary Streams for each data type, which are then packetized into a Packetized Elementary Stream (PES). Other data such as Subtitles data may also be packetized into PES packets. Multiple PES packets are in turn are combined into Transport or Program Streams, which also include other non-PES packets containing data such as Service information. The Transport or Program Streams are then sent over a communication network (e.g. digital TV broadcast system, or network based IPTV system) for delivery to the end viewer.

The Elementary Stream is packetized by encapsulating sequential data bytes from the Elementary Stream output from an encoder inside PES packets, which include PES headers.

A typical method of transmitting Elementary Stream data from a video or audio encoder is to first create PES packets from the elementary stream data and then to encapsulate these PES packets inside Transport Stream (TS) packets or Program Stream (PS) packets. The TS/PS packets can then be multiplexed with Service Information and transmitted using standard broadcasting techniques, such as defined by Digital Video Broadcasting (DVB) and ATSC (Advanced Television Systems Committee).

The Packetized Elementary Streams comprise Access Units, each Access Unit containing a small encoded portion of the video, audio or other type of data. Access units are similar in many ways to Internet Protocol (IP) packets, as used in computer networks like the Internet, in that they are packetized data including header data for describing and controlling how downstream equipment handles the respective payload data.

The end viewer uses a receiver, including decoding apparatus, to receive and decode the audio visual data from the received Transport Streams, for play back on a TV or other viewing apparatus. The receiver and decoding apparatus may be in the form of an integrated digital TV, digital TV set top box, or some kind of PC with the necessary decoding apparatus connected (e.g. a USB digital TV dongle).

Since the video, audio and any other associated data are sent over separate Packetized Elementary Streams, there are mechanisms in place to align the data together, so that it is played back at the end viewer in synchronisation. This is important because the audio, video or other data is often meant to be output in synchronisation with each other, to maintain lip sync, subtitle sync, etc.

Typically, to ensure synchronisation across the transmission system, e.g. between an encoder's clock reference and the local clock reference in the decoder (or other downstream equipment, such as a re-multiplexer), the individual Packetized Elementary Streams within a single Transport Stream are synchronised using a central Program Clock Reference (PCR). This is achieved by sending a PCR timestamp based upon the local encoder's clock reference out periodically in the output Transport Stream from an encoder, so that the downstream equipment's local clock reference can be updated with the requisite timing data from the encoder clock reference.

A Transport Stream is typically formed at the output of a multiplexer, which aggregates a number of Packetized Elementary Streams being output from multiple encoders (or being outputted from a memory store, having previously been encoded). If the encoders are local to one another, the encoders should be locally synchronised to a single clock.

There is also typically provided a System Clock Reference (SCR), which is a time stamp output within a Program Stream, as opposed to the Program Clock Reference (PCR), which appears in the aggregated Transport Stream that may contain multiple programs. In most common cases, the SCR values and PCR values function identically. However, in the MPEG-2 standard, the maximum allowed interval between SCRs is 700 ms, while the maximum allowed interval between PCRs is 100 ms. Both Program Streams and Transport Streams use Presentation Time Stamp (PTS) and Decode Time Stamp (DTS) for Access Unit decoding and presentation.

The Presentation Time Stamps indicate the instant when an access unit should be removed from the receiver buffer of a decoder, instantaneously decoded, and then presented for display.

The Decode Time Stamp indicates the time at which an Access Unit should be instantaneously removed from the receiver buffer and decoded. It differs from the Presentation Time Stamp only when picture reordering is used for B pictures. B pictures are encoded pictures which take input from other pictures in the sequence, either before or after the current picture. B pictures provide the greatest compression, but require a buffer to work, as data from before and after the point being decoded (or encoded) is required. If DTSs are used, PTSs must also be provided in the bit stream.

However, these synchronisation mechanisms are not infallible; hence delays can occur between associated Elementary Streams. The delays can be caused by a multitude of reasons, for example, the transmission equipment may be set up incorrectly, badly implemented (so that it does not synchronise with equipment from other manufacturers), or it can simply break down over use. Hence, there is a need to measure audiovisual (AV) delays that occur in working digital audiovisual transmission systems, in real-time, which may reside anywhere including the encoders, communications medium and decoders.

Previous solutions to measuring AV delay have been mainly focused in the uncompressed domain; that is, measurements from prior to the audio and video streams being encoded, to after they have been decoded at the viewer's end. These techniques have generally required a watermark to be added to the video stream, to which the audio may then be compared, i.e. this requires special test video and audio streams with which to make a measurement.

These prior efforts all have one thing in common, in that they attempt to measure the absolute delay between an audio and visual stream when compared with perfect timing synchronisation.

Furthermore, in some cases, multiple Transport Streams are re-multiplexed downstream, so that Packetized Elementary Streams from one Transport Stream may be recombined with other Packetized Elementary Streams from another Transport Stream, perhaps for local content insertion purposes. The donor Transport Stream may contain PCR, PTS and DTS timing errors resulting from poor encoder output that may then be manifested in the new, resultant Transport Stream.

SUMMARY

Accordingly, there is provided a method of measuring delay variation between first and second elementary streams in a digital audiovisual data stream, comprising detecting and storing digital audiovisual data stream timestamp values, detecting and storing elementary stream timestamp values for the first and second elementary streams, interpolating the digital audiovisual data stream timestamp values and elementary stream timestamp values to form data sets having mutual sampling points, and subtracting the interpolated data set for the first elementary data stream from the interpolated data set for the second elementary data stream to form elementary stream difference values indicative of changes in delay over time between first and second elementary streams.

This new AV delay measurement focuses solely on the causes of AV delays in the transmission system by measuring the change in AV delay over a period of time, rather than the absolute delay. These changes in delay are typically caused by lost or erroneous packets, large packet delay variations, re-multiplexers within the transmission system and irregular timing information transmission.

The described method provides a means to measure the change in delay over time between an audio and video PES within the same program contained in an MPEG-2 Transport Stream (TS) or Program Stream (PS). This delay is often referred to as lip sync. The method may also be used to measure the change in delay between any two or more Packetized Elementary Streams within the same Transport Stream, such as between a video Packetized Elementary Stream and its associated subtitles data Packetized Elementary Stream.

A measure of the change in delay between Elementary Streams provides test engineers with valuable data on the digital transmission system, which can aide locating faulty transmission portions, and the like.

Optionally, the method further comprises plotting and displaying a graph of the difference values, said difference values indicating delay variation between the first and second elementary streams over time.

Optionally, the method further comprises determining if the change in delay over time between first and second elementary streams is above a pre-determined threshold or rate of change, and providing an indication of exceeding the pre-determined threshold or rate of change to a user.

Optionally, the method further comprises integrating instantaneous timestamp data over a pre-determined period of time to remove spurious data fluctuation.

Optionally, the pre-determined period of time is a multiple of a frame duration, in the range of 0.08 to 5 seconds.

Optionally, the digital audiovisual data stream is a transport stream or program stream.

Optionally, the digital audiovisual data stream timestamps are PCR timestamps or SCR timestamps.

Optionally, the packetized elementary stream timestamps are DTS or PTS timestamps.

There is also provided a computer readable medium, comprising instructions which when executed by a processor cause said processor to carry out the described method.

There is also provided test equipment apparatus for measuring delay variation between at least first and second Elementary Streams in a digital audiovisual data stream, comprising digital audiovisual data stream timestamp detection circuitry adapted to detect digital audiovisual data stream timestamps in a Transport or Program Stream containing the first and second Elementary Streams, Elementary Stream timestamp detection circuitry adapted to detect Elementary Stream timestamps in a transport stream containing the first and second Elementary Streams, and processing logic adapted to carry out any of the described method.

Optionally, the digital audiovisual data stream is a Transport Stream or Program Stream, and the digital audiovisual data stream timestamps are PCR timestamps or SCR timestamps.

Optionally, the packetized Elementary Stream timestamps are DTS or PTS timestamps.

There is also provided an analyzer comprising the described apparatus, adapted to carry out any of the described method.

There is also provided operational monitoring equipment for use in a television Head End comprising the described apparatus, adapted to carry out any of the described method.

The method may be used between any two points within the transmission system where the respective Program Reference Clock (PCR) and Presentation Timestamp (PTS) values may be sampled and a common PCR time base is used. Program Streams use a System Clock Reference (SCR) time base instead of PCR, but it's operation and usage is similar to PCR implementation. Therefore, if apparatus for carrying out the described method is place across any transmission equipment, that equipment's delay characteristics can be measured, and then corrections can be made. Indeed, the delay tests may be carried out across whole portions of a transmission system instead.

BRIEF DESCRIPTION OF THE DRAWINGS

A method and apparatus for measuring change of delay within a compressed digital stream will now be described, by way of example only, and with reference to the accompanying drawings in which.

DETAILED DESCRIPTION

Figure 1:
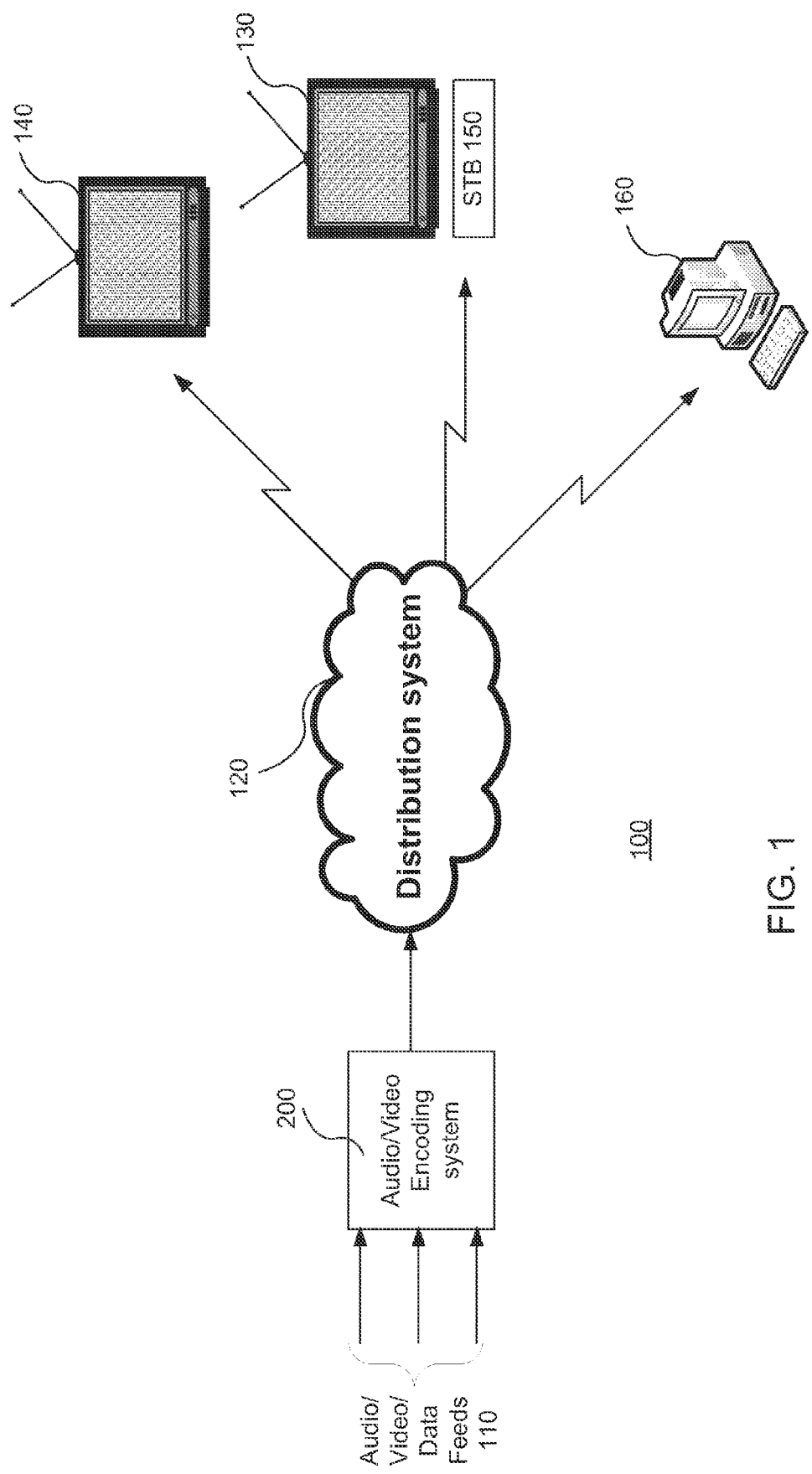
FIG. 1 shows a high level schematic diagram of a typical digital audio visual transmission system, such as a TV Broadcast network.

An embodiment of the invention will now be described with reference to the accompanying drawings in which the same or similar parts or steps have been given the same or similar reference numerals.

The following description is cast in terms of measuring a time delay between a first (e.g. video) Packetized Elementary Stream and an associated second (e.g. audio) Packetized Elementary Stream. However, it will be apparent that the same method and apparatus may be used to measure the delay between any associated Packetized Elementary Streams within a transport or program stream.

FIG. 1 shows a schematic high level diagram of a typical digital audio visual transmission system, where input Audio/Video/Data feeds 110 are input into a Audio/Video Encoding system 200, which produces a Transport Stream (or Program Stream(s)) for sending out over a distribution system 120, out to end viewers using integrated digital TVs 140, TVs 130 connected through set-top boxes 150, or a suitably equipped PC or similar computing device 160. The exact nature of the distribution system is not important, it could be an over the air transmitter based system, such as is used for broadcast terrestrial TV, or it could equally be a satellite broadcast system, IP network or the like. The present invention is not limited to any particular distribution system 120.

Figure 2:
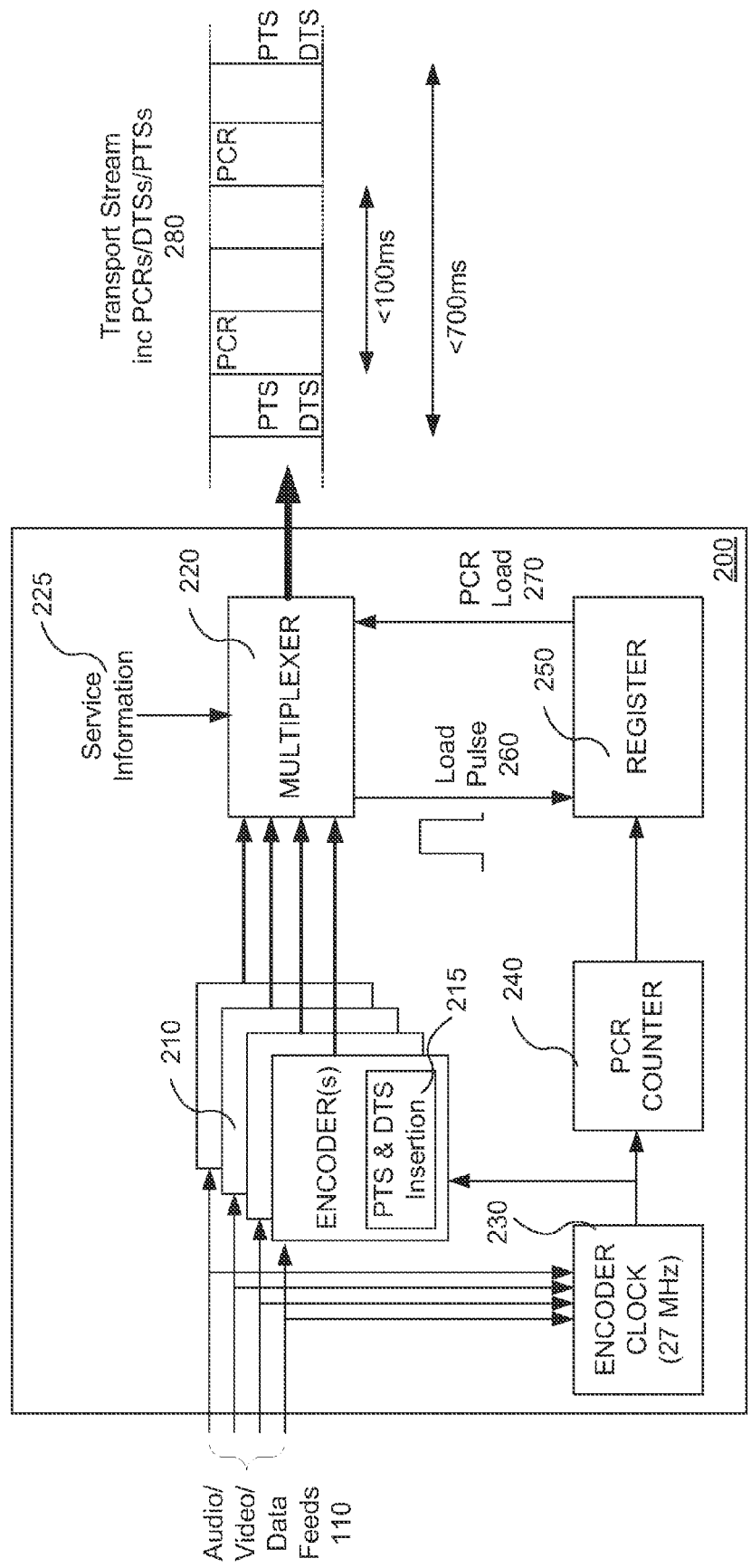
FIG. 2 shows a more detailed schematic diagram of a typical digital video encoding system to which an embodiment of the present invention may be applied.

FIG. 2 shows the Audio/Video encoding system 200 of FIG. 1 in more detail.

Respective video, audio or other data 110 is fed into encoder(s) 210 having PTS or DTS value insertion circuitry 215. The encoder(s) 210 may be formed as a bank of separate encoders operating in real-time, one for each of the video, audio or data streams (as shown), or the encoder 210 may be formed as a single encoder working on all data streams separately (for example, when the video, audio or data streams are encoded in non real-time and stored locally prior to combination into a Transport Stream).

A local encoder clock 230, typically operating at 27 Mhz, provides the local time base to the PCR counter 240 and PTS/DTS insertion circuitry 215. The PCR counter is typically a 42 bit counter.

The PTS and DTS timestamps are a typically a 33 bit counter incrementing at a rate of 90 kHz. Both are referenced to the PCR for the same program, albeit at a lower time resolution.

The PTS/DTS insertion circuitry 215 inserts the respective PTS/DTS timestamp values for each Packetized Elementary Stream as part of the encoding process. However, since the PCR time base is universal (and due the layered nature of the data streams), the PCR values are typically inserted once the individual Packetized Elementary Streams have been multiplexed together at multiplexer 220. Service information 225 which is not encoded by encoders is also included at the multiplexer 220.

An exemplary PCR insertion apparatus is shown, which comprises a register containing the required PCR value (derived from the PCR counter 240), which is loaded 270 into the relevant Transport Stream packet at the multiplexer upon receipt of a Load pulse 260.

The output of the encoding system 200, is a transport stream 280 (or program stream, where appropriate) including both the PCR (or SCR) values and DTS/PTS values.

Figure 3:
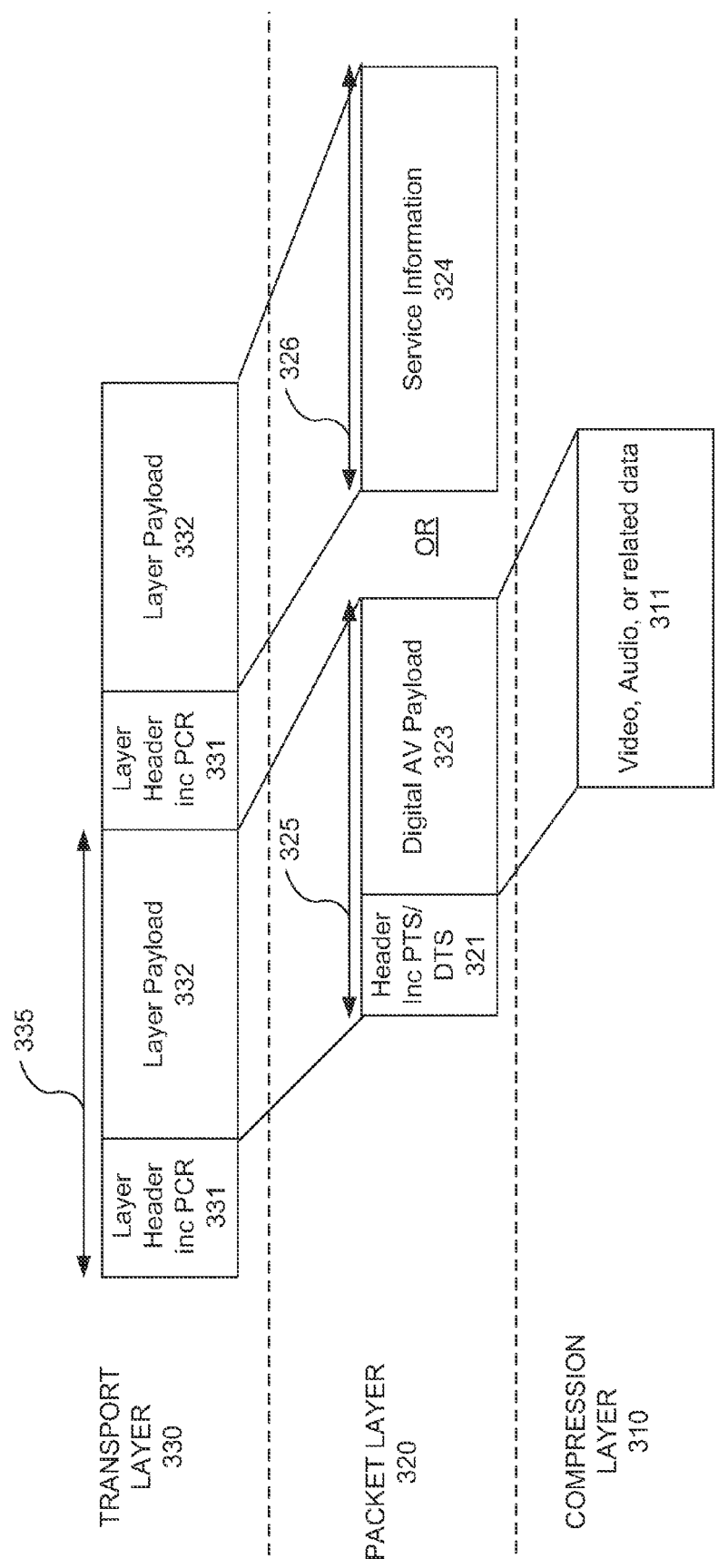
FIG. 3 shows a schematic diagram of an exemplary construction of a Transport Stream (TS), including how the TS is formed from layers of packetized data, with different header data.

FIG. 3 shows an exemplary construction of a Transport Stream 280, including how the Transport Stream is formed from layers of packetized audio, video or other data, with different header data.

A transport Stream 280 comprises multiple layers of data. Compressed video or audio data, in the form of an elementary stream, is packetized in the compression layer 310 to form video or audio access units 311. A header is then added to the compressed video or audio access units in a Packet layer 320 to form PES packets 325 comprising a digital audio/visual (or other data, such as subtitles) payload portion 323 and PES header 321. The PES header 321 includes the DTS and/or PTS values. Alternatively, the other data packets 326 may be formed of service information 324.

The different types of PES packets 325, and other data packets 326, form the Transport layer payload 332, which are combined with a respective Transport layer header 331 to form a transport layer packet 335, which are combined into a transport stream 280 in the transport layer 330.

The Transport layer header 331 optionally contains the PCR timestamps within an adaptation field (remembering that PCR timestamps only need to be sent at least every 100 ms, so not every packet will contain a PCR timestamp). The transport layer header 331 adaptation field may also include other data items, such as a splicing point flag, random access indicator and the like. The Transport Stream header also includes other data required of the particular standard in use, such as a sync byte, flags and or other indicators, plus a Packet Identifier (PID). The PID is a unique identifier for each elementary stream plus Service Information within the Transport Stream.

Figure 4:
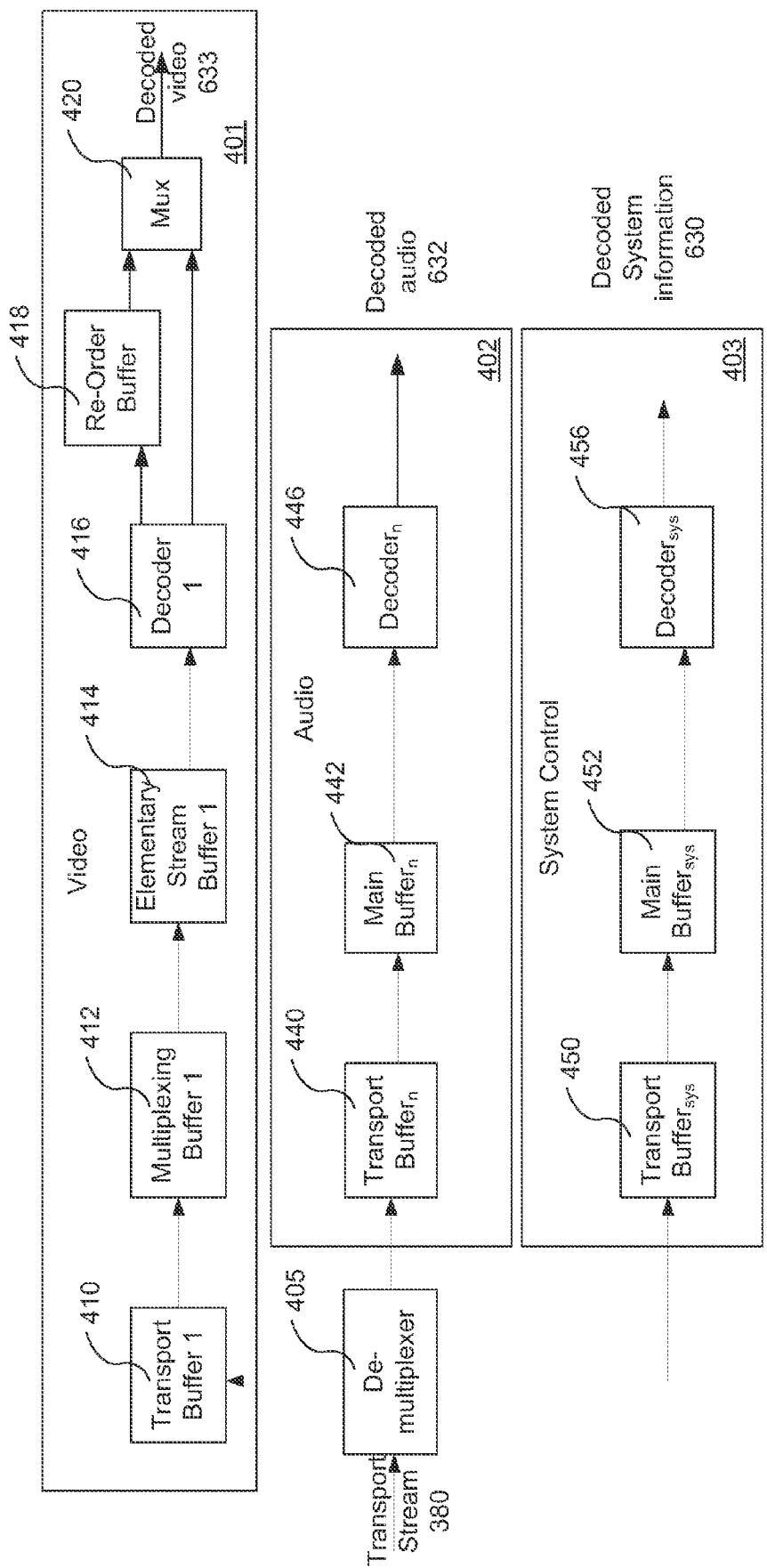
FIG. 4 shows a schematic diagram of an exemplary System Target Decoder (T-STD) for a Transport Stream of FIG. 3, illustrating the data flow of each Elementary Stream through a series of buffers within a STB receiver.

FIG. 4 shows a schematic diagram of an exemplary System Target Decoder (T-STD) 400 for a Transport Stream of FIG. 3, illustrating the data flow of each Elementary Stream through a series of buffers within a STB receiver.

A decoder 400 typically comprises a separate decoding path for each elementary stream type. Since the transport stream 280 may contain any combination of video, audio or data elementary streams, where necessary, the decoder may comprise multiple decoding paths for each type (e.g. 1 video decode path, 2 audio decode paths and 1 data decode path). A de-multiplexer 405 de-multiplexes the different elementary streams out of the transport stream, to feed into each respective decode path.

The example in FIG. 4 shows the case where there is only a single decode path for each elementary stream type.

The video decode path 401 comprises a transport buffer 410, for removing inter packet jitter from the input stream. The transport buffer 410 feeds a multiplexing buffer 412, for regulating data flow, for example according to whether the video is standard definition or high definition. The multiplexing buffer 412 feeds an elementary stream buffer 414, for storage prior to actual decoding.

The audio and system Main Buffers (442 and 452) perform a similar function to the video Elementary Buffer 414.

The multiplexing buffer 412 feeds the video decoder 416, which decodes the video data into respective pictures for sequential playback. The pictures may be in the form of frames or fields. Where B pictures are used, a re-order buffer 418 and multiplexer 420 are used to re-instate the correct playback order. The final, correctly ordered, video data 633 is then available at the output for display.

The encoder 200, including the multiplexer 220, must ensure that the timestamps within the outputted Transport Stream or program streams (PCR, SCR, PTS and DTS) are chosen such that the buffers in the decoder neither under nor overflow, as this may cause a disruption to the viewer.

A similar process is used in both the audio and data decode paths. However, they only require a transport buffer (440, 450) and main buffer (442, 452) before the decoder, since there are no re-ordering issues.

The audio decode path produces decoded audio 632, while the data decode path produces decoded data, e.g. system information 630.

There is no synchronisation between the PCR and PTS/DTS timestamps, so the PCR and PTS timestamps are transmitted at different times. Therefore, to directly compare a PTS or DTS with a PCR, interpolation must be carried out, unless the two happen to be sent within the same Transport Stream packet, which is unlikely.

With reference to FIG. 4, the Decoding Timestamp (DTS) refers to the time at which the first Access Unit within the PES shall be removed from the video Elementary Stream Buffer 414 (or Main Buffer for audio/data) and decoded. The Presentation Timestamp (PTS) refers to the time at which the Access Unit is displayed to the user. For audio streams, the PTS equals the DTS. For video streams, the Access Units may be transmitted in a different order to the display order, due the forward and backward referencing used in MPEG compression. Access Units that use potential forward and backward referencing provide the greatest compression and are known as bi-directional or B pictures. The consequence is that some Access Units must be decoded before they are displayed to the user, during which time they are stored in the Reorder Buffer. A DTS and PTS are not required for every Access Unit, but they must be transmitted at least every 700 ms. The decoding and presentation times for intermediate Access Units may be interpolated by the receiver.

Due to the fact that audio and video (and any other data) Packetized Elementary Streams within the same Transport Stream program use the same PCR time base, the PTS values for Elementary Stream 1 (e.g. video) can be plotted on the same graph (not shown) as the PTS values for Elementary Stream 2 (e.g. audio).

It is then possible to subtract the sampled PTS values from the common PCR time base, to provide the PTS-PCR variation of the two Packetized Elementary Streams. More than two Packetized Elementary Streams may be sampled, if required.

Figure 5:
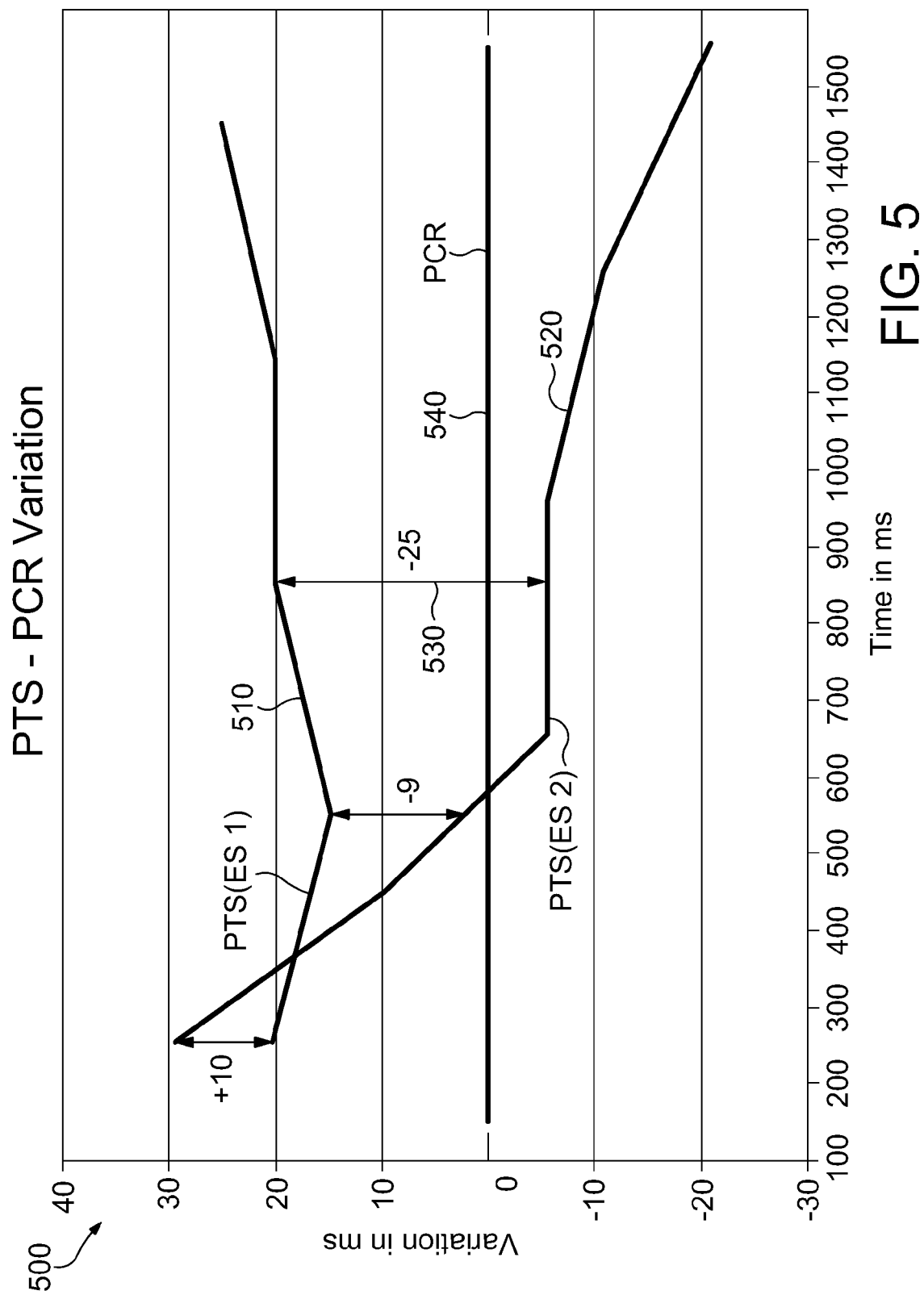
FIG. 5 shows a graph of example PTS data for different Elementary Streams 1 and 2 plotted against a common Program Clock Reference.

FIG. 5 shows a graph 500 of example PTS data for two different Packetized Elementary Streams 1 and 2 against the common Program Clock Reference derived using this variation information, i.e. the variation for Packetized Elementary stream 1 (e.g. Video) 510 has been plotted against the variation for Packetized Elementary Stream 2 (e.g. Audio) 520.

Figure 6:
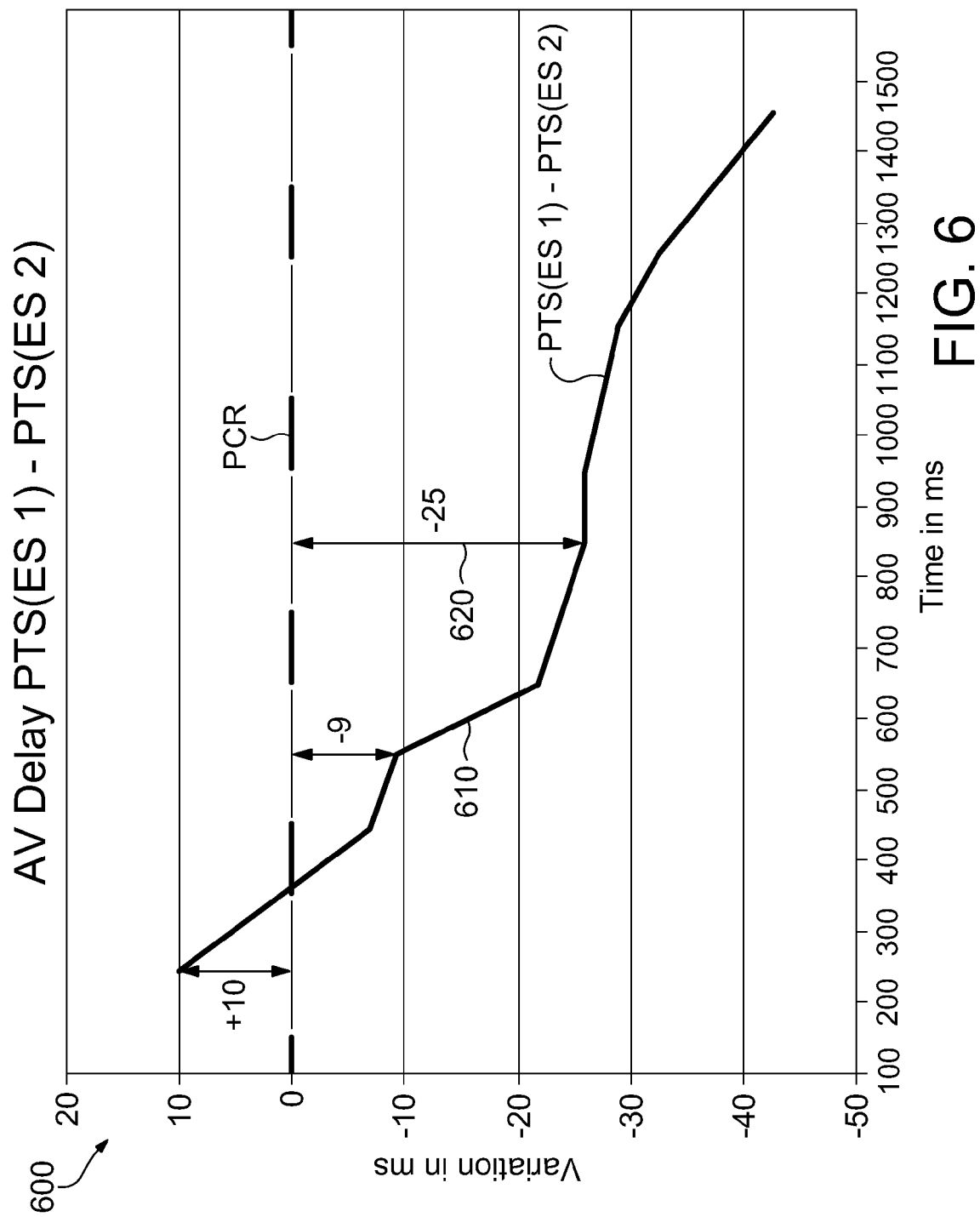
FIG. 6 shows a graph of PTS (Elementary Stream 1)-PTS (Elementary Stream 2) vs PCR for the example data presented in FIG. 5.

Then, it is possible to produce a graph showing the PTS (Elementary stream 1)-PTS (Elementary stream 2). This is shown in FIG. 6, and is effectively a plot 600 of audiovisual (AV) Delay 610 caused by the portion of the distribution system 120 across which the test equipment carrying out the described method is placed. The difference 620 between the PTS (Elementary stream 1)-PTS (Elementary stream 2) plot 610 and the base line is the delay at that point in time.

A point may be plotted on the graph for each PTS in either Packetized Elementary Stream. The PTS difference value is calculated by interpolating the effective PTS for the other Packetized Elementary Stream.

There may be high frequency variations in the graphs caused by use of different sized frames, but these can be smoothed out by integrating the instantaneous PTS values over a predetermined time period, e.g. 1 second. Longer or shorter integration periods, such as 0.5 seconds to 5 seconds may equally be used, the important feature being that the total integration time is a multiple of a single frame duration (which in the case of 24 frame per second video is 33 ms). Using this smoothed version of the method is most useful for detecting long term trends in AV delay variations, rather than spurious individual values.

In practice, video frame reordering (using B-pictures) will likely occur, due to the compression improvements provided by doing so. The video frame reordering will also contribute to high frequency variations in the PTS-PCR graph. Therefore, it may be preferable to plot the difference in Decode Time Stamps (DTS) instead of PTS. Note that for audio and other data Packetized Elementary Stream types, where frame reordering is not used, the DTS and PTS values for the same frame are equal. Thus, any implementation that used DTS instead of PTS will work equally for reordered and non-reordered Elementary Streams.

Figure 7:
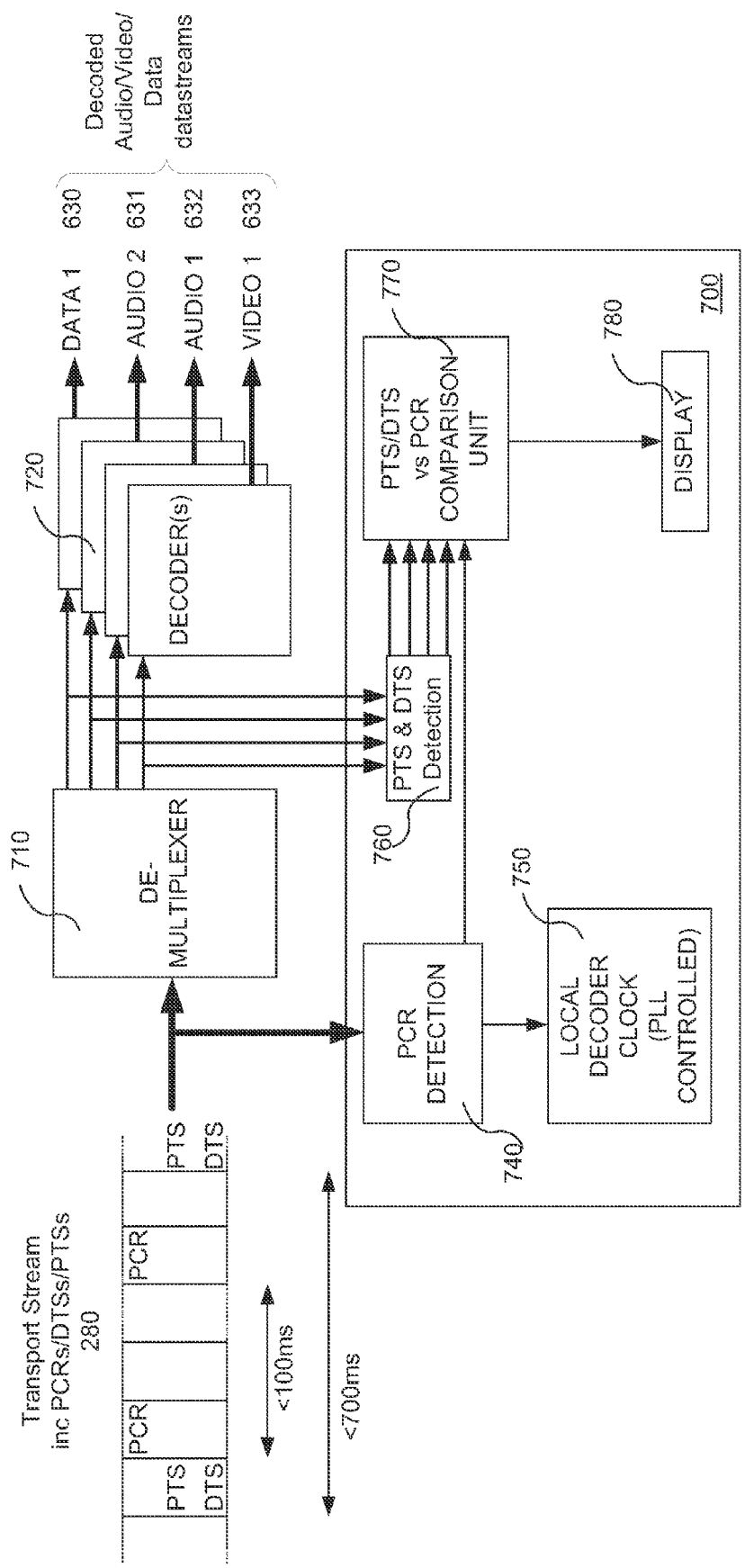
FIG. 7 shows a schematic diagram of a typical decoding system having test equipment according to an embodiment of the present invention attached, in order to test Elementary Stream delay.

FIG. 7 shows how Packetized Elementary Stream delay test & measurement equipment 700 according to an embodiment of the present invention may be attached to portions of a digital audiovisual transmission system 120, in order to test delays being caused by specific portions of the overall system. In the example shown, the delay being caused by a de-multiplexer 710 is being measured by comparing input PCR values from the input transport stream 280, with output PTS or DTS values for each Packetized Elementary Stream going to a separate decoder 720, each of which produces a separate decoded audio, video or data bitstream.

The Packetized Elementary Stream delay test & measurement equipment 700 comprises a PCR detection unit 740, which controls a local decoder clock 750 (e.g. Phase lock loop clock). The PCR detection unit 740 provides the PCR values to a PTS/DTS vs PCR comparison unit 770. The comparison unit is also fed the respective PTS/DTS values for each stream being tested, via PTS & DTS detection unit 760. The comparison unit calculates all the required values for plotting as graphs, as shown in FIGS. 5 and 6. The test equipment 700 can be configured to shown any type of graph which can display the sampled data, depending on what a user wishes to see.

Alternatively, for example in the case of implementing the described method of measuring change in AV delay in an operational monitoring equipment located in a television Head End, the monitoring equipment may be adapted to provide audible warnings when a certain level of change in AV delay is detected, or a certain rate of change in AV delay is detected. This would not require actual display of the graphs plots of FIGS. 5 and 6. In such an implementation, it is likely that multiple Packetized Elementary Streams, if not all PES being broadcast from the Head end will be monitored, rather than just two as shown in FIG. 8.

Figure 8:
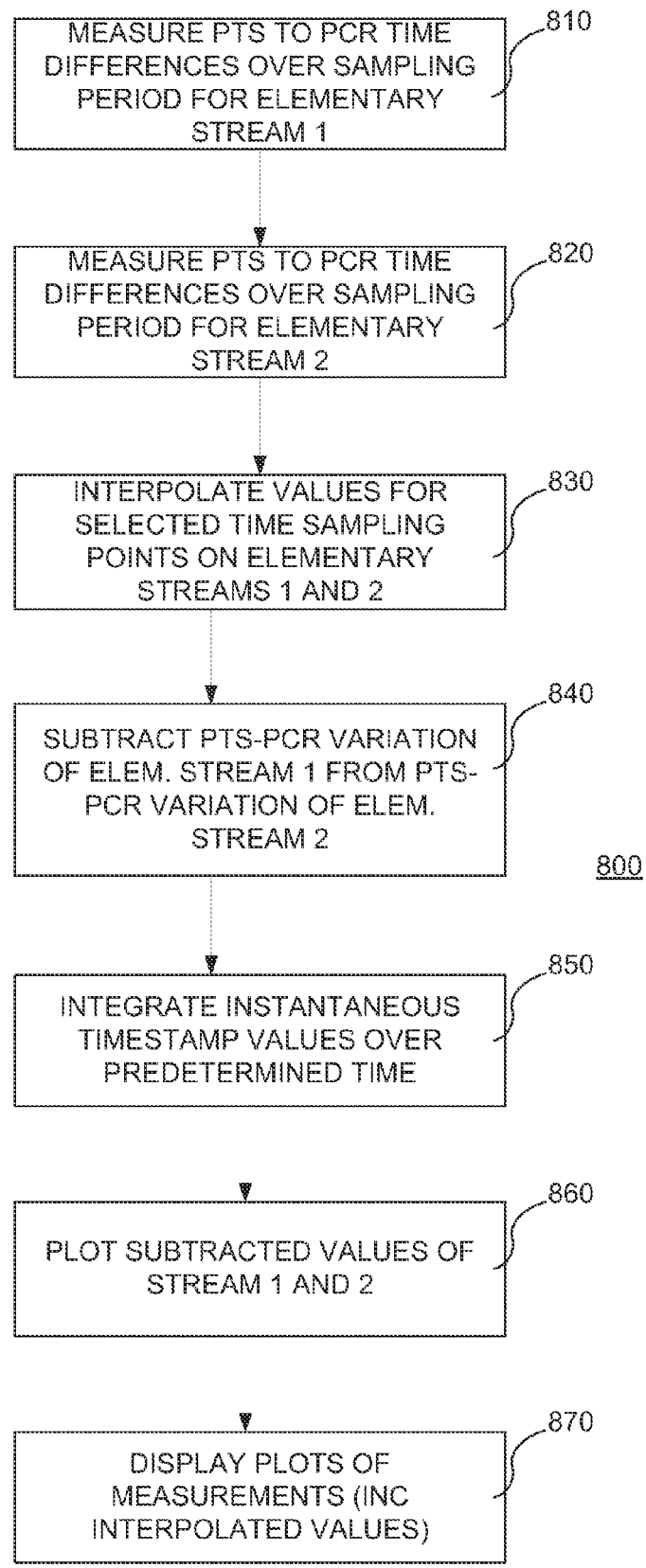
FIG. 8 shows a high level flow diagram of the method for determining change in delay between separate Elementary Streams according to an embodiment of the present invention.

FIG. 8 shows a high level flow diagram example of the method for determining change in delay between two separate Packetized Elementary Streams according to an embodiment of the present invention, being applied to two Packetized Elementary Streams only.

The method comprises measuring the PTS or DTS timestamp vs PCR timestamp for Packetized Elementary Stream 1 810, followed by measuring the PTS or DTS timestamp vs PCR timestamp for Packetized Elementary Stream 2 820.

At step 830, the sampled PTS or DTS timestamp vs PCR timestamp data is interpolated to allow direct comparison between the PTS/DTS values and the PCR values which would otherwise not coincide, as discussed in more detail above, with reference to FIG. 5.

Once correctly coinciding data is available, the values for Packetized Elementary Stream 1 is subtracted from the values for Packetized Elementary Stream 2 (to produce the data for the graph in FIG. 6).

An integration step 850 follows, to smooth out the sampled data, in order to remove spurious data fluctuations. Then, the data is plotted into graphs 860, and displayed 870 at the control of a user, or used to drive a warning system that detects when certain thresholds or changes in rates occurs.

A key part of the proposed apparatus and method invention is that it will work on any audio and video stream that is encapsulated into a PES packet. This is important as it means that a measurement may be made on any broadcast Transport Stream and also where the user has no control over the source audio and video material.

The method described herein is not restricted to measuring the delay between a packetized audio and video Elementary Stream, but may equally be applied to measuring the delay between any two Packetized Elementary Streams that are encapsulated within a PES packet and which reference the same PCR System Time Clock. For example, it could be used to measure the change in delay between video and its associated subtitle stream.

This measurement will also work on AV streams that are scrambled at the PES layer, as the method only requires PES header and transport layer, and associated adaptation field parameters, which are not typically encrypted even in an encrypted Transport Stream (only the actual audio/visual payload are encrypted).

Whilst the above description has been cast in terms of the MPEG-2 system, the method and apparatus may equally be used in any equivalent digital audio/video transmission or broadcast system using compression techniques that utilises timestamps equivalent to the PCR and PTS/DTS time stamps, including Video on Demand (VOD). For example, the method may be used in MPEG-4, H.264 or VC-1 for both Standard and High Definition video data.

The above described method may be carried out by any suitably adapted or designed hardware. Portions of the method may also be embodied in a set of instructions, stored on a computer readable medium, which when loaded into a processor or computer having a Digital Signal Processor (DSP) or similar, which causes the processor or computer to carry out the hereinbefore described method.

Equally, the method may be embodied as a specially programmed, or hardware designed, integrated circuit which operates to carry out the described delay measurement method when loaded into said integrated circuit. The integrated circuit may be formed as part of a general purpose computing device, such as a PC, and the like, or it may be formed as part of a more specialised device, such as a hardware test and/or measurement equipment device, or the like.

One exemplary hardware embodiment is that of a Field Programmable Gate Array (FPGA) programmed to provide the described apparatus and/or to carry out the described method, the FPGA being located within a test or measurement equipment device.

Another exemplary hardware embodiment of the present invention is that of one or more Application Specific Integrated Circuits (ASICs), located within a test or measurement equipment device.

It will be apparent to the skilled person that the exact order and content of the steps carried out in the method described herein may be altered according to the requirements of a particular set of execution parameters, such as speed, quality, and the like. The use of averaging, to overcome spurious instantaneous measured values, is optional, and the extent of use will depend on the implementation parameters. Furthermore, it will be apparent that different embodiments of the disclosed apparatus may selectively implement certain features of the present invention in different combinations, according to the requirements of a particular implementation of the invention as a whole. Accordingly, the claim numbering is not to be construed as a strict limitation on the ability to move features between claims, and as such portions of dependent claims maybe utilised freely.

The invention claimed is:

1. A method of measuring delay variation between first and second elementary streams in a digital audiovisual data stream, comprising:
    detecting and storing digital audiovisual data stream timestamp values;
    detecting and storing elementary stream timestamp values for the first and second elementary streams;
    interpolating the digital audiovisual data stream timestamp values and elementary stream timestamp values to form data sets having mutual sampling points; and
    subtracting the interpolated data set for the first elementary data stream from the interpolated data set for the second elementary data stream to form elementary stream difference values indicative of changes in delay over time between first and second elementary streams.

2. The method of claim 1, further comprising:
    plotting and displaying a graph of the difference values, said difference values indicating delay variation between the first and second elementary streams over time.

3. The method of claim 1, further comprising:
    determining if the change in delay over time between first and second elementary streams is above a pre-determined threshold or rate of change; and
    providing an indication of exceeding the pre-determined threshold or rate of change to a user.

4. The method of claim 1, further comprising integrating instantaneous timestamp data over a pre-determined period of time to remove spurious data fluctuation.

5. The method of claim 4, wherein the pre-determined period of time is a multiple of a frame duration.

6. The method of claim 1, wherein the digital audiovisual data stream is a transport stream or program stream.

7. The method of claim 1, wherein the digital audiovisual data stream timestamps are PCR timestamps or SCR timestamps.

8. The method of claim 1, wherein the elementary stream timestamps are DTS or PTS timestamps.

9. A computer readable medium, comprising instructions which when executed by a processor cause said processor to carry out the method of claim 1.

10. Test equipment apparatus for measuring delay variation between at least first and second Elementary Streams in a digital audiovisual data stream, comprising:
    digital audiovisual data stream timestamp detection circuitry adapted to detect digital audiovisual data stream timestamps in a Transport or Program Stream containing the first and second Elementary Streams;
    Elementary Stream timestamp detection circuitry adapted to detect Elementary Stream timestamps in a transport stream containing the first and second Elementary Streams; and
    processing logic including:
    means for detecting and storing digital audiovisual data stream timestamp values;
    means for detecting and storing elementary stream timestamp values for the first and second elementary streams;

means for interpolating the digital audiovisual data stream timestamp values and elementary stream timestamp values to form data sets having mutual sampling points; and means for subtracting the interpolated data set for the first elementary data stream from the interpolated data set for the second elementary data stream to form elementary stream difference values indicative of changes in delay over time between first and second elementary streams.

11. The apparatus of claim 10, wherein the digital audiovisual data stream is a Transport Stream or Program Stream, and the digital audiovisual data stream timestamps are PCR timestamps or SCR timestamps.

12. The apparatus of claim 10, wherein the Elementary Stream timestamps are DTS or PTS timestamps.

13. The apparatus of claim 11, wherein the Elementary Stream timestamps are DTS or PTS timestamps.

* * * * *